Figure 1:
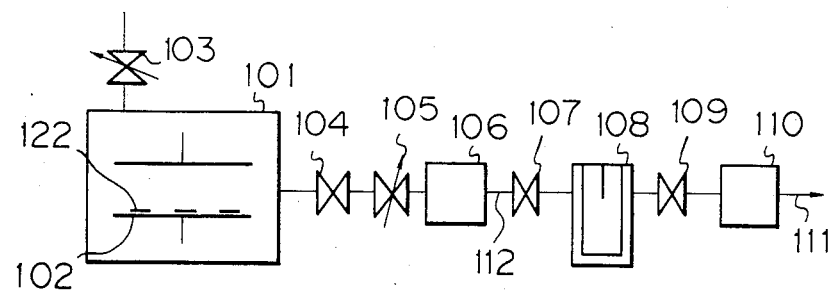

United States Patent [19]

Tsukada et al.

[11] Patent Number: 4,655,800
[45] Date of Patent: Apr. 7, 1987

[54] WASTE GAS EXHAUST SYSTEM FOR VACUUM PROCESS APPARATUS

[75] Inventors: Tsutomu Tsukada; Ishao Ashaishi; Tatsunori Koizumi; Kouji Ikeda, all of Fuchu, Japan

[73] Assignee: Anelva Corporation, Tokyo, Japan

[21] Appl. No.: 714,302

[22] Filed: Mar. 21, 1985

[30] Foreign Application Priority Data

Mar. 21, 1984 [JP] Japan ................................ 59-53894

[51] Int. Cl.$^4$ ............................................ B01D 53/04
[52] U.S. Cl. ...................................... 55/195; 55/208; 55/387
[58] Field of Search .................... 55/71, 72, 179, 189, 55/195, 387, 208

[56] References Cited

U.S. PATENT DOCUMENTS

| | | | |
|---|---|---|---|
| 2,333,748 | 11/1943 | Sperry | 55/71 |
| 3,059,396 | 10/1962 | Thees | 55/189 |
| 3,498,025 | 3/1970 | Bednarski | 55/179 X |
| 3,616,611 | 11/1971 | Gentili | 55/71 X |
| 4,088,456 | 5/1978 | Giorgi et al. | 55/189 X |
| 4,106,918 | 8/1978 | Fujikawa et al. | 55/71 |
| 4,247,519 | 1/1981 | Sano | 55/189 X |

FOREIGN PATENT DOCUMENTS 122241  7/1958  U.S.S.R. ................................ 55/71

*Primary Examiner*—Robert Spitzer
*Attorney, Agent, or Firm*—Pollock, VandeSande & Priddy

[57] ABSTRACT

An exhaust system utilizes a booster pump and an auxiliary pump of vacuum process apparatus which vacuum treats a substrate with gases of the chlorine series. A vessel of the auxiliary pump on the air exhaust side is filled with an inert gas of a pressure higher than the atmospheric pressure, and a dry adsorption column capable of adsorbing the gases of the chlorine series is connected to an air exhaust pipe of the auxiliary pump. Further, a dust trap having a cooling surface is provided between the booster pump and the auxiliary pump, and the wall surface of the gas passage between the booster pump and the auxiliary pump is heated.

8 Claims, 2 Drawing Figures

WASTE GAS EXHAUST SYSTEM FOR VACUUM PROCESS APPARATUS

BACKGROUND OF THE INVENTION

1. Field of the Invention

The present invention relates to a waste gas exhaust system for use with apparatus for vacuum treating substrates with gases of the chlorine series, and more particularly to a waste gas exhaust system which is designed for long service life and easy maintenance.

2. Description of the Prior Art

In the manufacture of semiconductor integrated circuits, vacuum processes such as dry etching, plasma CVD, low-pressure CVD and so forth, which employ halides, will come into wider use. In ordinary vacuum process of this kind, a reactive gas of a halide or the like is introduced into a reaction chamber, wherein a reactive plasma is generated under lowered pressure for treating substrates in a vacuum. Consequently, the waste gas exhaust system for such a vacuum process apparatus degenerates in performance more seriously than do exhaust systems for other vacuum equipment. When a conventional exhaust system is used with the vacuum process apparatus employing halides, its exhausting capacity may sometimes be impaired in a day. Especially, in the case of dry etching apparatus for aluminum, which uses chlorinated compounds, such as $CCl_4$, $BCl_3$, $Cl_2$, etc., since the exhaust gas contains not only unreacted gases but also strongly acidic reaction products, such as HCl and $AlCl_3$, the exhaust system for discharging these reaction products undergoes more serious deterioration. Some solutions to this problem have been proposed so far, but any satisfactory exhaust system has not as yet been available which withstands severe conditions imposed during operation of vacuum process apparatus on a mass-production scale.

Conventionally, an exhaust system for a reactive dry etching apparatus includes valves, an oil-sealed rotary pump, a booster pump, a gas trap, pipes, an exhaust port and so forth. When aluminum is etched using a gas consisting principally of $BCl_3$ gas, $BCl_3$ and $AlCl_3$ are adsorbed in large quantities in the gas trap to decrease its adsorbing capacity, resulting in lowering of the exhaust rate. Purging or cleaning of the gas trap to avoid it, however, poses a problem as it generates large quantities of HCl and $B_2O_3$ powder, which clogs or corrodes the gas trap, a pipe for purging and the valves.

On the other hand, in the case in which no gas trap is provided, $BCl_3$, HCl, $AlCl_3$ and so on get mixed into oil of the oil-sealed rotary pump to degrade it and, further, the $BCl_3$ reacts with the air in the oil-sealed rotary pump to evolve large quantities of $B_2O_3$ power and HCl. The $B_2O_3$ powder cannot be sufficiently filtered out by an oil filtration system, and shortens the service life of the pump.

A proposal has been made to fill the oil-sealed rotary pump with a inert gas. With this method, however, large quantities of $B_2O_3$ and HCl are produced at the exhaust port; in particular, the $B_2O_3$ powder blocks an exhaust duct to lower the ability of the oil-sealed rotary pump.

Further, $AlCl_3$ is formed in large quantities, in addition to the $B_2O_3$ powder, and it adheres to pipes, valves, etc. on the downstream side of the booster pump. If the pipes, valves and so on are heated for removing it, the $AlCl_3$ powder reacts with water contained in the oil of the oil-sealed rotary pump to form strong acids, or it gets mixed into the oil, decreasing the efficiency of the oil-sealed rotary pump.

SUMMARY OF THE INVENTION

It is therefore an object of the present invention to provide an exhaust system for vacuum process apparatus which is free from the above-mentioned defects of the prior art and adapted for preventing the $B_2O_3$ powder, HCl and $AlCl_3$ from entering into the oil-sealed rotary pump.

Another object of the present invention is to provide an exhaust system for vacuum process apparatus which is easy to maintain and lengthens the service life of the oil-sealed rotary pump, thereby improving the operation of the vacuum process apparatus on a mass-production scale.

In accordance with an aspect of the present invention, in an exhaust system which utilizes a booster pump and an auxiliary pump of a vacuum process apparatus for vacuum treating substrates with gases of the chlorine series, the interior of a chamber of the auxiliary pump on the side leading to the atmosphere is filled with an inert gas at a pressure exceeding the atmospheric pressure, and a dry adsorption column capable of adsorbing the gases of the chlorine series is connected to an exhaust pipe of the auxiliary pump.

In accordance with another aspect of the present invention, a dust trap having a cooling surface is provided between the booster pump and the auxiliary one, and the wall of a gas passage between the booster pump and the dust trap is heated.

Other objects, features and advantages of the present invention will become more fully apparent from the following detailed description taken in conjunction with the accompanying drawings.

BRIEF DESCRIPTION OF THE DRAWINGS

FIG. 1 is a schematic diagram showing an exhaust system for aluminum dry etching apparatus heretofore employed; and FIG. 2 is a schematic diagram illustrating an exhaust system for aluminum dry etching apparatus according to an embodiment of the present invention.

DESCRIPTION OF THE PREFERRED EMBODIMENT

To facilitate a better understanding of the present invention a description will be given first, with reference to FIG. 1, of a conventional exhaust system for an aluminum dry etching apparatus.

FIG. 1 illustrates in block form an exhaust system for a conventional aluminum dry etching apparatus, more specifically, a reactive ion etching apparatus. For reactive ion etching of aluminum, substrates 122 are placed on a high-frequency electrode 102 in a reaction chamber 101, into which a reactive gas consisting principally of such chlorine-containing gases such as $CCl_4$, $BCl_3$, $Cl_2$ and the like is introduced via a gas introduction valve 103. The substrates 122 are etched by a reactive gas plasma with the pressure in the reaction chamber 101 held at several pascals. The exhaust gas, which includes an unreacted gas and reaction products, is discharged via an etching valve 104 and a throttle valve 105 by means of a roots blower pump 106 which serves as a booster pump. The roots blower pump 106 has connected thereto, on the downstream side, via a pipe 112 and a valve 107 a gas trap 108 cooled by liquid nitrogen and via valve 109 an oil- sealed rotary pump 110 serving as an auxiliary pump. The exhaust gas is ultimately discharged from an exhaust duct 111 into atmosphere. In view of the working gas pressure region for etching aluminum with reactive ions and the gas flow rate necessary for etching, the roots blower pump 106 must be provided by all means, and the gas trap 108 is also needed so as to prevent exhausting of the reactive gas directly to the oil-sealed rotary pump 110.

In the case of etching aluminum on a mass-production scale, especially in the case of using a gas consisting principally of $BCl_3$ gas, the exhaust system of FIG. 1 encounters many difficulties such as described below. First, $BCl_3$ and $AlCl_3$ are adsorbed in large quantities in the gas trap 108 which rapidly impairs its adsorbing ability, decreasing the exhaust rate. In the worst case, the gas trap 108 requires nitrogen purging and cleaning once or more a day so as to maintain its absorbing capacity. In addition, since large quantities of HCl and $B_2O_3$ powder are produced by the purge and cleaning, the gas trap 108, the pipe 112 and the valves 107 and 109 corrodes and, further, the pipe for purging clogs, resulting in marked reduction of the productivity of the dry etching apparatus.

An attempt has been made to dispense with the gas trap 108. Without the gas trap 108, however, the performace of the oil-sealed rotary pump 110 is seriously impaired. The reason for this is that large quantities of $BCl_3$, HCl, $AlCl_3$ and so forth enter into the oil-sealed rotary pump 110 to deteriorate its oil and, further, the $BCl_3$ reacts with the air in the oil-sealed rotary pump 110 to form therein $B_2O_3$ powder and HCl in large quantities. The deterioration of the oil in the pump 110 can be prevented by the use of fluorine oil. It has also been proposed to provide an oil filtration system outside the oil-sealed rotary pump 110 for removing the large quantities of $B_2O_3$ powder, but the powder cannot sufficiently be filtered out by the filtration system. Further, the use of the filtration system damages the sliding part of the pump to extremely shorten the service life of the oil-sealed rotary pump 110; in the worst case, its exhausting capabilities will be lost within a month.

To obviate this defect, an attempt has been made to fill the interior of the oil-sealed rotary pump 110 with an inert gas such as nitrogen gas, but in this case, $BCl_3$ reacts with the air at the exhaust port to form large quantities of $B_2O_3$ and HCl and, in particular, the $B_2O_3$ powder blocks up the exhaust duct 111, damaging the performance of the oil-sealed rotary pump 110. Moreover, since the $B_2O_3$ powder and HCl formed in the exhaust duct 111 diffuse into the oil-sealed rotary pump 110, the life time of the pump cannot be increased. Another attempt has been made to remove the $BCl_3$ by providing a water scrubber on the side of the exhaust duct, but this method fails to sufficiently remove the $BCl_3$ and rather incurs the generation of large quantities of $B_2O_3$.

Furthermore, there has arisen in the prior art a problem that $AlCl_3$, which is a reaction product of aluminum, is also formed in great quantities, in addition to the $B_2O_3$ powder, and adheres to the pipe 112, the valve 107, etc. on the downstream side of the roots blower pump 106. A solution proposed to avoid this is to heat the pipe 112 and the valve 107, but in this case, the $AlCl_3$ flows into the oil-sealed rotary pump 110 and reacts with water contained in the oil to from strong acids, or gets mixed, in the form of powder, into the oil, resulting in further reduction of the performance of the oil-sealed rotary pump.

Figure 2:
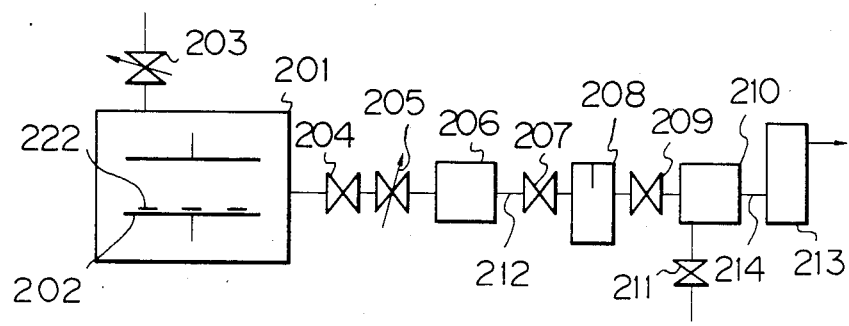

FIG. 2 illustrates an exhaust system of a reactive ion etching apparatus embodying the present invention. A reactive gas is introduced via a gas introduction valve 203 into a reaction chamber 201 of the etching apparatus, in which are etched substrates 222 placed on a high-frequency electrode 202. The reactive gas passes through an etching valve 204 and a throttle valve 205, thereafter being discharged by an axial-flow turbo-molecular pump 206. The axial-flow turbo-molecular pump 206 has connected thereto, on the downstream side, via a pipe 212, a valve 207, a water-cooled dust trap 208, a valve 209 and an oil-sealed rotary pump 210 using a fluorinated oil and serving as an auxiliary pump. The pipe 212 and the valve 207 are heated at about 60° C. Nitrogen gas is introduced via a purge valve 211 into a chamber of the oil-sealed rotary pump 210 to hold the pressure therein at a value exceeding the atmospheric pressure. Further, a dry adsorption column 213 for selectively adsorbing gases of the chlorine series, in particular, $BCl_3$ (a device disclosed in, for example, Japanese Patent Public Disclosure No. 122025/83 gazette) is connected to the exhaust port of the oil-sealed rotary pump 210 via pipe 214 which is shielded from the air.

In the case of etching the aluminum-clad substrates 222 through the use of the etching apparatus provided with the abovesaid exhaust system, the reaction chamber 201 is evacuated to a vacuum first and then 100 to 300 SCCM of a reactive gas consisting principally of $BCl_3$ and $Cl_2$ is introduced via a gas introduction valve 203 into the evacuated reaction chamber 201. Next, the etching valve 204 is opened, through which the pressure in the reaction chamber 201 is adjusted by the throttle valve 205 to range from 4 to 13 pascals, and then high-frequency power is applied to the high-frequency electrode 202 from a power source not shown.

Reaction products such as $AlCl_3$ and so on and unreacted introduced gases $BCl_3$ and $Cl_2$, which are waste gases, are exhausted by the axial-flow turbo-molecular pump 206 from the reaction chamber 201 via the etching valve 204 and the throttle valve 205 and led into the dry adsorption column 213 via the dust trap 208 and the oil-sealed rotary pump 210. The $AlCl_3$ which is one of the reaction products is lower in vapor pressure than the other gases, and hence is likely to adhere to the inner wall surfaces of the pipe 212 and the valve 207 when the waste gas is compressed on the downstream side of the turbo-molecular pump 206 to raise its pressure. The present inventors have ascertained, as a result of their repeated experiments, that substantially no $AlCl_3$ would adhere to the inner wall surface of the gas passage when the temperature of the wall surface is held above 60° C. Accordingly, this embodiment is arranged so that the pipe 212 and the valve 207 can be heated. This permits almost all the $AlCl_3$ to be led to the dust trap 208. The dust trap 208 has provided therein water cooling means formed by a water-cooled baffle plate or mesh made of stainless steel, and traps a majority of the $AlCl_3$ with the cooling surface of the water cooling means using cooling water of 20° C. or so. At such a low cooling temperature, however, unreacted gases such as $BCl_3$ and the like are not trapped at all and flow into the oil-sealed rotary pump. Consequently, the dust trap 208 is not contaminated with the $BCl_3$, and hence need not be frequently cleaned, and cleaning of the dust trap 208 can be done simply by rinsing the baffle or mesh part with water. Further, since the cleaning does not involve removal of substances which are trapped by purging, the time required for cleaning can be shortened and no pipe needs to be provided for purging. In addition, since the dust trap 208 is free from corrosion by acids, its maintenance is markedly simplified as compared with that of a conventional cold trap which is cooled by liquid nitrogen The exhaust gas, from which the $AlCl_3$ was selectively removed by the dust trap 208, flows into the oil-sealed rotary pump 210, and the exhaust gas in this case consists principally of $BCl_3$ and $Cl_2$. As mentioned previously, the $BCl_3$, upon exposure to the air, readily forms a white powder or $B_2O_3$ under the influence of the water content in the air. To avoid this, in this embodiment nitrogen gas is introduced via a purge valve 211 into the chamber of the oil-sealed rotary pump 210 to keep the pressure therein higher than the atmospheric pressure. This prevents the air from entering into the oil-sealed rotary pump container, ensuring elimination of the possibility that the $BCl_3$ reacts with the water content in the air to form the $B_2O_3$ powder. Moreover, since the dry adsorption column 213 for selectively adsorbing the $BCl_3$ and like chlorine compounds is connected to the exhaust side of the oil-sealed rotary pump 210, formation of the $B_2O_3$ and HCl is also suppressed and no $B_2O_3$ powder will diffuse into the oil-sealed rotary pump 210. Thus, the amount of refuse which is produced in the oil-sealed rotary pump can be reduced extremely lower than in the past. Further, it is also possible to prevent corrosion of the oil-sealed rotary pump 210 by strong acids such as HCl and so forth. Since the $BCl_3$ is removed by the dry adsorption column 213, no $B_2O_3$ is precipitated in the pipe 214, too, so there is no likelihood of the exhaust port of the oil-sealed rotary pump 210 being clogged up to impair its exhaust characteristic.

Thus, the service life of the oil-sealed rotary pump 210 is largely lengthened. It has been ascertained that the oil-sealed rotary pump 210, whose operating life was as short as a month in the conventional exhaust system well operates for working on a mass-production scale for more than eight months.

While the above embodiment employs the axial-flow turbo-molecular pump as a booster pump, it is evident that the same results obtainable with the above embodiment could also be obtained by using a roots blower pump as the booster pump, and this has been made sure by experiments. It is also evident that the gas with which the air in the rotary pump is replaced need not be limited specifically to nitrogen but may be inert gases which do not react with $BCl_3$ and so on.

Moreover, the present invention is not limited specifically to the aluminum etching apparatus described above in connection with the embodiment, but may also be applied to the etching of polycrystalline silicon and like materials with gases of the chlorine series, as well as to plasma CVD and low-pressure CVD apparatus for vacuum process with compound gases of the chlorine series.

In short, according to the present invention, those components of the exhaust gas from the vacuum process apparatus which are low in vapor pressure are removed by a trap of easy maintenance at the stage preceding the oil-sealed rotary pump, and the exhaust gas components are prevented as much as possible from reacting in the oil-sealed rotary pump and are removed by the external adsorption column, thereby avoiding deterioration of oil of the oil-sealed rotary pump. The present invention is not limited to the kinds of vacuum process apparatus and booster pump used.

The use of the exhaust system of the present invention, described above, facilitates the maintenance of vacuum process apparatus for mass-production-scale running, increases the service life of the oil-sealed rotary pump and substantially eliminates corrosion and clogging of pipes. The exhaust system of the present invention is of particular utility when employed for aluminum dry etching apparatus.

It will be appreciated from the foregoing that the exhaust system of the present invention will greatly contribute to the manufacture of semiconductor devices, and hence is of great utility from the industrial point of view.

It will be apparent that many modifications and variations may be effected without departing from the scope of the novel concepts of the present invention.

What is claimed is:

1. An exhaust system for vacuum process apparatus using chlorine-containing gases for treating a substrate in a vacuum which includes a booster pump and an auxiliary pump located downstream of said booster pump comprising:
   means for filling a chamber of the auxiliary pump on the air exhaust side thereof with an inert gas at a pressure above atmospheric pressure; and
   a dry adsorption column capable of adsorbing the chlorine-containing gases, said adsorption column having a gas inlet connected to an air exhaust pipe of the auxiliary pump and an outlet for gases communicating with the atmosphere.

2. An exhaust system according to claim 1 wherein the auxiliary pump is an oil-sealed rotary pump.

3. An exhaust system according to claim 1 wherein the booster pump is a turbo-molecular pump.

4. An exhaust system according to claim 1 wherein the booster pump is a roots blower pump.

5. An exhaust system for vacuum process apparatus using chlorine-containing gases for treating a substrate in a vacuum which includes a booster pump, an auxiliary pump located downstream of said booster pump, comprising:
   a dust trap having a cooling surface and located between the booster pump and the auxiliary pump;
   gas passages extending between the booster pump and the dust trap and between the dust trap and the auxiliary pump;
   means for heating the wall surface of said gas passage between the booster pump and the dust trap;
   means for filling a chamber of the auxiliary pump on the air exhaust side with an inert gas at a pressure above atmospheric pressure; and
   a dry adsorption column capable of adsorbing the chlorine-containing gases, said adsorption column having a gas inlet connected to an air exhaust pipe of the auxiliary pump and an outlet for gases communicating with the atmosphere.

6. An exhaust system according to claim 5 wherein the auxiliary pump is an oil-sealed rotary pump.

7. An exhaust system according to claim 5 wherein the booster pump is a turbo-molecular pump.

8. An exhaust system according to claim 5 wherein the booster pump is a roots blower pump.

* * * * *

UNITED STATES PATENT AND TRADEMARK OFFICE
CERTIFICATE OF CORRECTION

PATENT NO. : 4,655,800
DATED : April 7, 1987
INVENTOR(S) : Tsutomu Tsukada, et al.

It is certified that error appears in the above-identified patent and that said Letters Patent is hereby corrected as shown below:

Column 1, line 58, change "a" to --an--.

Column 3, line 22, change "corrodes" to --corrode--.

Column 3, bridging lines 26 and 27, change "performace" to --performance--.

Column 3, line 67, change "from" to --form--.

Signed and Sealed this

Twenty-fifth Day of April, 1989

*Attest:*

DONALD J. QUIGG

*Attesting Officer*  *Commissioner of Patents and Trademarks*